United States Patent [19]

Pamer et al.

[11] 4,258,768
[45] Mar. 31, 1981

[54] FASTENER ASSEMBLY

[75] Inventors: Walter R. Pamer, Parma; Terry D. Capuano, Hinckley, both of Ohio

[73] Assignee: The Lamson & Sessions Co., Cleveland, Ohio

[21] Appl. No.: 106,476

[22] Filed: Dec. 26, 1979

[51] Int. Cl.³ .............................................. B60C 27/00
[52] U.S. Cl. .................................. 152/176; 152/185.1; 152/188; 305/19; 305/54; 403/290; 403/343; 411/167; 411/183; 411/280; 411/308
[58] Field of Search ............... 152/175, 176, 172, 187, 152/188, 208, 167, 170, 179, 225 R, 225 C, 228, 185.1; 151/21 C, 21 R, 14 R, 22; 85/84; 305/19, 54; 403/343, 289, 290

[56] References Cited

U.S. PATENT DOCUMENTS

| 2,036,604 | 4/1936 | Pickop | 151/22 |
| 2,316,684 | 4/1943 | Gade | 151/21 R |
| 2,488,214 | 11/1949 | Marsilius | 85/84 X |
| 3,742,809 | 7/1973 | Zifferer | 85/84 |
| 3,773,394 | 11/1973 | Grawey | 305/19 |
| 3,815,962 | 6/1974 | Stedman et al. | 305/54 X |
| 4,043,609 | 8/1977 | Vidakovic et al. | 152/179 |
| 4,059,313 | 11/1977 | Beyers et al. | 305/19 |
| 4,155,393 | 5/1979 | Grawey | 152/352 R X |

Primary Examiner—William A. Powell
Assistant Examiner—Thomas Bokan
Attorney, Agent, or Firm—Yount & Tarolli

[57] ABSTRACT

An improved fastener assembly includes an externally threaded member or bolt having a thread convolution with a relatively long trailing flank surface and a relatively short leading flank surface. An internally threaded member or nut also has a thread convolution with a relatively long trailing flank surface and a relatively short leading flank surface. The nut is grooved to provide an expandable section. When the nut and bolt are tightened, the relatively long trailing flank surfaces of the thread convolutions cause the grooved portion of the nut to expand to completely fill a hole. The opposite end of the nut is contracted to clamp against a thread convolution on the bolt. In one embodiment of the invention, a relatively short leading flank surface of the bolt extends at an acute angle to the relatively short leading flank surface of the nut to provide clearance between the internal and external thread convolutions. In another embodiment of the invention, the grooves in the nut extend only part way through the thread convolution in the nut.

8 Claims, 11 Drawing Figures

FASTENER ASSEMBLY

BACKGROUND OF THE INVENTION

A known wheel assembly includes a split rim upon which an inflatable tire carcass is mounted. In order to protect the tire carcass when the wheel assembly is used in harsh environments, an endless track assembly is mounted on the outside of the tire carcass. The endless track assembly includes a mounting belt which extends around the tire carcass and track shoes which are disposed on the outside of the mounting belt. The track shoes are held in place on the mounting belt by retainer bars or members which are secured to the track shoes by fastener assemblies. A wheel assembly having this general construction is illustrated in U.S. Pat. No. 4,155,393.

During use of the previously described wheel assembly, difficulty may be encountered due to loosening and/or breaking of the fastener assemblies which secure the shoe members to the retainer members. Loosening and/or breaking of the fastener assembly is promoted by the fact that relatively high shear forces are present between the retainer member and shoe member. The relatively high shear forces result from the fact that the shoe member engages the ground or other support surface while the retainer member is held in place on the tire carcass. This construction results in the transmission of drive forces through the fastener assembly interconnecting the retainer and shoe members.

In order to prevent loosening and/or breaking of the fastener assembly, holes have been accurately located and drilled to a predetermined size in both the retainer member and the shoe member. Even though attempts have been made to locate these holes in both the shoe and retainer members with an accuracy of a thousandth of an inch in an overall shoe and retainer length of approximately 40 inches, difficulty has been encountered. In part, this difficulty results from a loosening of the fastener assembly due to tolerances in the hole size and/or hole location in the retainer and shoe members.

SUMMARY OF THE PRESENT INVENTION

The present invention provides a new and improved fastener assembly which is advantageously utilized to mount shoe members of an endless track assembly on a tire carcass. In order to enhance the operating life of the endless track assembly, the fastener assembly includes an externally threaded member or bolt which expands an internally threaded member or nut to completely fill any excess space in a hole in which the nut is received. In addition, the bolt causes a portion of the nut to contract and clamp the bolt in place.

To effect simultaneous expansion and contraction of different portions of the nut, the nut and bolt have thread convolutions with relatively long trailing flank surfaces which apply a wedging action against the sides of the nut. The nut is grooved so that a portion of the nut is free to expand under the influence of a wedging action between the relatively long trailing flank surfaces of the internal and external thread convolutions. A ungrooved body portion of the nut is contracted under the influence of the wedging action to securely clamp or grip the bolt.

In order to make the nut as strong as possible, the leading flank surface on the bolt is formed to extend at an acute angle to the leading flank surface on the nut. This relationship between the flank surfaces of the internal and external thread convolutions enables the inherently weaker internal thread convolution to have a relatively large cross sectional area.

During heat treating and/or handling of the nut, a thin walled grooved section of the nut may become deformed. In order to prevent this from happening, the groove my extend only part way through the thin wall of the expandable section of the nut. This results in the groove being spanned by crest portions of the internal thread convolution to hold sections of the nut against movement relative to each other.

Although a fastener assembly constructed in accordance with the present invention is advantageously utilized in an endless track assembly to hold a shoe in place, it is contemplated that the fastener assembly could be utilized in many different environments. It is believed that the fastener assembly will be particularly advantageous in environments where relatively large shear forces are present between members which are to be interconnected. By forming the nut in such a manner that it can be expanded to eliminate excess space in a hole in which a portion of the nut is received, any shearing action between a pair of interconnected members tends to be minimized to thereby enhance the operating life of a connection between the members. Thus, it is contemplated that a fastener assembly constructed in accordance with the present invention could be utilized to interconnect plates in structures, such as bridges or buildings, in which the fastener assembly is subjected to relatively large shear forces.

Accordingly, it is an object of this invention to provide a new and improved fastener assembly in which an externally threaded member cooperates with an internally threaded member to expand a portion of the internally threaded member to eliminate excess space in an opening in which the internally threaded member is received and to contract another portion of the internally threaded member to clampingly engage a turn of an external thread convolution on the externally threaded member.

Another object of this invention is to provide a new and improved assembly as set forth in the next preceding object and wherein the internal and external thread convolutions have relatively long trailing flank surfaces which cooperate to provide a wedging action between the internal and external thread convolutions to effect expansion of a portion of the internally threaded member and contraction of another portion of the internally threaded member upon tightening of the connection between the internally and externally threaded members.

Another object of this invention is to provide a new and improved assembly as set forth in the next preceding object and wherein the internal and external thread convolutions have relatively short leading flank surfaces which extend at an acute angle to each other to tend to maximize clearance space between the internal and external thread convolutions.

Another object of this invention is to provide an new and improved assembly as set forth in any of the preceding objects and wherein a groove in the internally threaded member is spanned by the crest of an internal thread convolution to hold portions of the internally threaded member against relative movement until the externally threaded member is tightened with sufficient force to rupture the portions of the internal thread convolutions spanning the groove.

BRIEF DESCRIPTION OF THE DRAWINGS

The foregoing and other objects and features of the present invention will become more apparent upon a consideration of the following description taken in connection with the accompanying drawings wherein.

DESCRIPTION OF SEPCIFIC PREFERRED EMBODIMENTS OF THE INVENTION

Figure 1:
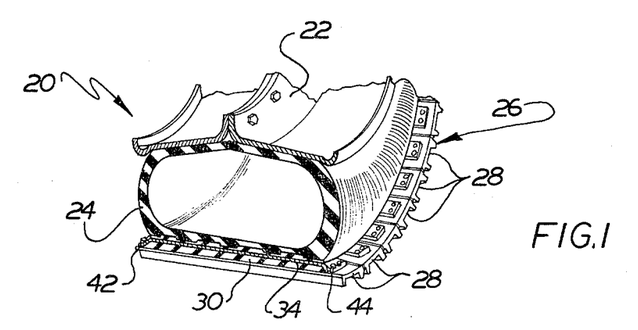
FIG. 1 is a fragmentary sectional view of a wheel having an endless track assembly.

A circular wheel 20 (FIG. 1) is used on tractors and other vehicles. The wheel 20 includes a circular split rim assembly 22 upon which an annular inflatable tire carcass 24 is mounted. In order to protect the tire carcass 24, an endless track assembly 26 extends around the tire carcass 24. The track assembly 26 includes a circular mounting belt 30 (see FIG. 2) which extends around the annular tire carcass 24. Metal track shoes 28 are disposed in a circular array about the outer side surface of the mounting belt 30.

A portion of the mounting belt 30 is clamped between a longitudinally extended track shoe 28 and a longitudinally extending retainer bar 34. The retainer bar 34 has a straight main or central section 38 which extends parallel to the longitudinal central axis of an associated track shoe 28. Each of the retainer bars 34 has a pair of end sections 42 and 44 (FIG. 1) which are connected to an associated track shoe 28 by a plurality of fastener assemblies 48 (FIG. 2).

Figure 2:
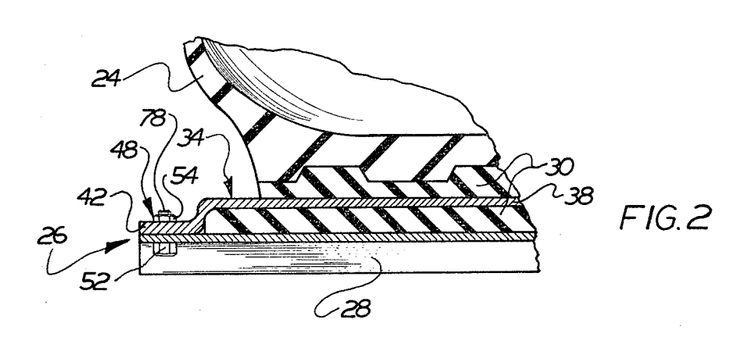
FIG. 2 is a fragmentary sectional view, on an enlarged scale, of a portion of the wheel of FIG. 1 and illustrating the manner in which a fastener assembly constructed in accordance with the present invention connects a shoe with a retainer member in the endless track assembly.
Figure 3:
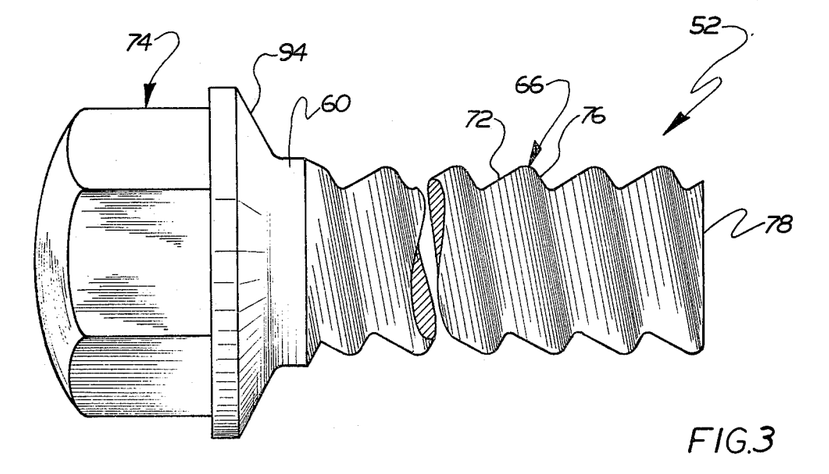
FIG. 3 is an enlarged fragmentary view of a bolt or externally threaded member which is used in the fastener assembly of FIG. 2.
Figure 4:
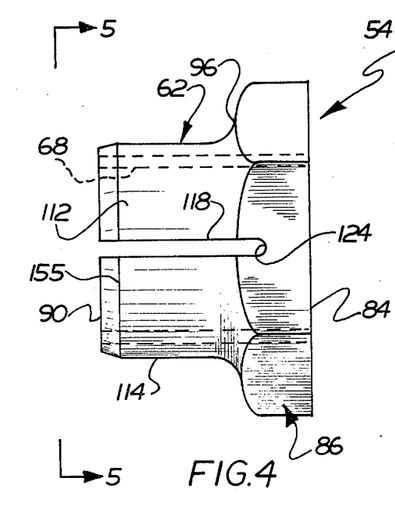
FIG. 4 is an illustration, on an enlarged scale of a nut or internally threaded member used in the fastener assembly of FIG. 2.
Figure 5:
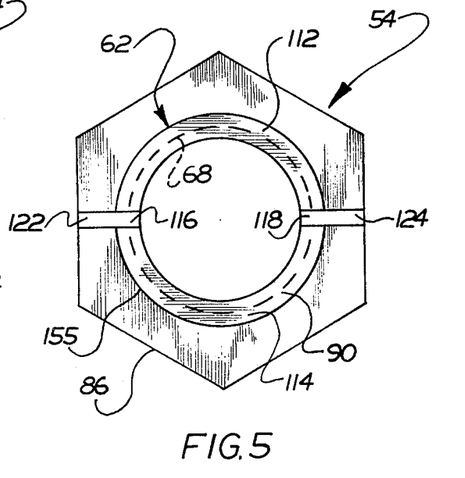
FIG. 5 is a plan view, taken generally along the line 5—5 of FIG. 4, further illustrating the construction of the nut.

Each of the fastener assemblies 48 includes a bolt or externally threaded member 52 (see FIGS. 2 and 3) and a nut or internally threaded member 54 (see FIGS. 2, 4 and 5). A pair of the fastener assemblies 48 are provided at each end of a retainer bar 34 and track shoe 28 to interconnect the retainer bar and track shoe with their straight longitudinally extending central axes parallel to each other.

With previously constructed wheels having endless tracks similar to the track 26, difficulty has been encountered due to breaking of the fasteners used to interconnect the retainer bars and track shoes. This breaking of prior art fastener assemblies has been due to the relatively high shear forces which are present between the track shoes 28 and retainer bars 34. These relatively high shear forces result from the transmittal of driving force between the ground engaging track shoes 28 and the retainer bars 34 which connect the track shoes with the mounting belt 30. If the openings in the track shoes 28 and/or retainer bars 34 through which the fastener assemblies 48 extend are slightly oversize, relative movement can occur between the track shoe 28 and retainer bar. This relative movement accentuates the shear loading to which the fastener assemblies 48 are subjected and tends to cause loosening of the fastener assemblies. Of course, once a fastener assembly 48 begins to loosen, relative movement between the fastener assembly, track shoe 28 and retainer bar 34 quickly leads to failure of the fastener assembly.

In accordance with a feature of the present invention, the fastener assembly 48 is effective to completely fill the openings in the track shoe 28 and retainer bar 34 through which the fastener assembly extends. This minimizes the possibility of relative movement occurring between a track shoe 28 and retainer bar 34 to thereby minimize any possibility of loosening of the fastener assembly. Therefore a fastener assembly 48 can withstand the relatively high shear forces to which it subjected during operation of a vehicle associated with a wheel 20. It should be noted that this is accomplished without a relatively high degree of accuracy in sizing and locating of the fastener holes in the retainer bars 34 and track shoes 28.

The bolt 52 has a cylindrical shank 60 which is accurately sized to be received in and fill a circular hole in a track shoe 28. The nut 54 has a thin walled cylindrical collar or leading section 52 (FIG. 4) which is expanded radially outwardly to completely fill a circular hole in the retainer bar 38. Although the fastener assembly 48 has been shown and described as having the shank 60 of the bolt 52 received in a circular hole in track shoe 28 and the collar 62 of the nut 54 as being received in a circular hole in the retainer bar 34, their orientation could be reversed so that the shank 60 of the nut would be received in a hole in the retainer bar 34 and the collar 62 of the nut 54 could be received in a hole in the track shoe 28.

Figure 6:
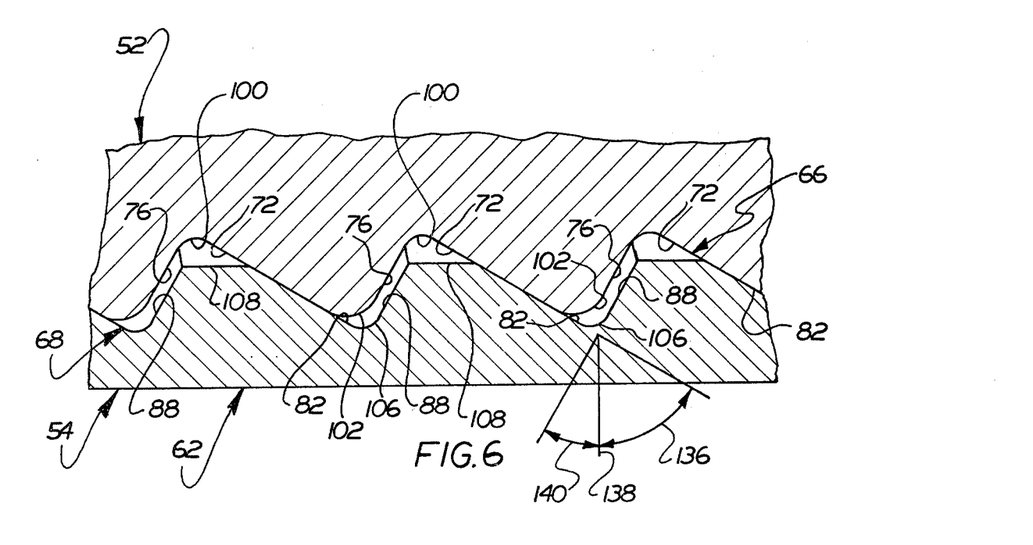
FIG. 6 is a fragmentary section view, on an enlarged scale, illustrating the manner in which an external thread convolution on the bolt of FIG. 3 cooperates with an internal thread convolution on the nut of FIGS. 4 and 5.

In order to effect expansion of the thin walled collar 62 to completely fill a slightly oversized hole in a retainer bar 34, the bolt 52 has a helical external thread convolution 66 (FIG. 3) which cooperates with a helical internal thread convolution 68 (FIGS. 4 and 5) formed in the nut 54 to expand the collar radially outwardly. This allows the nut 54 to eliminate any excess space which may be present in the hole in which the collar is received due to tolerances in drilling or otherwise forming the hole. The manner in which the external thread convolution 66 on the bolt 52 cooperates with the internal thread convolution 68 of the nut 54 is shown in FIG. 6.

In order to provide for expansion of the collar 62, the external thread convolution 66 on the bolt 52 and the internal thread convolution 68 on the nut 54 are designed to provide a camming or wedging action once the nut and bolt have been initially tightened. To provide this wedging or camming action, the internal and external thread convolutions 66 and 68 are provided with a relatively long trailing flank surfaces which abut each other. Thus, the helical external thread convolution 66 (FIG. 3) on the bolt 52 has a relatively long trailing flank surface 72 which is disposed on a trailing side of the tread convolution 66 toward the head on trailing end 74 of the bolt. Similarly, a relatively short flank surface 76 is disposed on a leading side of the thread convolution 66 toward a free or leading end 78 of the bolt.

The helical internal thread convolution 68 (see FIG. 6) in the nut 54 has a relatively long trailing flank surface 82 which faces toward a polygonal trailing and surface 84 on a hexagonal body or end portion 86 of the nut 54 (see FIG. 4). The trailing flank surface 82 of the internal thread convolution 68 is disposed in abutting engagement with the trailing flank surface 72 of the bolt 52 throughout the length of the internal thread convolution (see FIG. 6). The internal thread convolution 68 also has a relatively short leading flank surface 88 which faces toward a leading end surface 90 (FIG. 4) on the collar 62 of the nut.

When the retainer bar 34 is to be connected with a track shoe 28 (FIG. 2) by tightening the fastener assembly 48, the nut 54 is positioned with the collar 62 extending into a circular opening in the retainer bar 34. The opening in the retainer bar 34 has a slightly larger outside diameter than the outside diameter of the cylindrical collar 62. Th excess space in the retainer bar hole enables the nut 54 to be shifted slightly relative to the retainer bar to facilitate engaging the bolt 52 even if the holes in the retainer bar and track shoe are not in exact alignment. It should be understood that although the opening in the retainer bar is slightly larger than the outside diameter of the collar 62 so that excess space is present in the hole through the retainer bar, there is a relatively small difference between the diameter of the hole and the diameter of the collar 62.

The bolt 52 is positioned with the cylindrical shank 60 extending into a circular hole in the track shoe 28. The hole in the track shoe 28 is accurately formed so that it has an inside diameter which almost exactly matches the outside diameter on the shank 60. Therefore the bolt 52 is held against sidewise movement by the cooperation between the shank 60 and the track shoe 28.

The leading or free end 78 of the bolt 52 is then turned into the nut 54. This results in the leading flank surface 76 on the bolt coming into engagement with the leading flank surface 88 on the nut. As the bolt 52 is threaded into the nut 54, the relatively long trailing flank surface 72 on the bolt moves into abutting engagement with the relatively long trailing flank surface 82 on the nut.

Continued relative rotation between the nut 54 and bolt 52 results in the leading end 78 of the bolt moving inwardly through the collar 62 toward the body portion 86 of the nut 54 (see FIG. 4). As the bolt and nut are tightened, a frustroconical side surface 94 (FIG. 3) on the bolt head 74 moves into abutting engagement with a similarly shaped counterbore formed in the track shoe 28. This holds the bolt 52 against further axial movement relative to the track shoe. In addition, an axially tapered and generally frustroconical side surface 96 (see FIG. 4) on the nut 54 moves into abutting engagement with a similarly shaped counterbore formed in the retainer bar 34. Although the bolt head 74 and nut body 86 are provided with tapered seating surfaces 94 and 96, flat radially extending seating surfaces could be utilized if desired.

Upon initial tightening of the fastener assembly 48, the two seating surfaces 94 and 96 on the bolt 52 and nut 54 engage corresponding counterbore surfaces on the retainer bar 34 and track shoe 28 to hold the nut and bolt against further axial movement relative to each other. At this time, the bolt 52 extends through the nut 54 and projects from the body portion 86 of the nut. Therefore, the external thread convolution 66 engages the internal thread convolution 68 throughout the length of the internal thread convolution.

Figure 7:
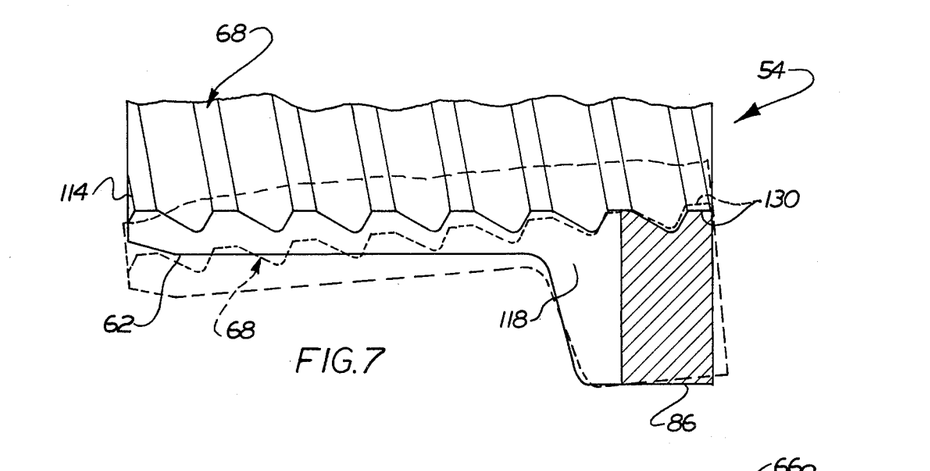
FIG. 7 is an enlarged fragmentary sectional view of a portion of the nut of FIG. 4 and schematically illustrating in an exaggerated manner how a portion of the nut is expanded and another portion of the nut is contracted.

Once the fastener assembly 48 has been initally tightened so that the seating surface 94 and 96 on the nut and bolt are disposed in abutting engagement with the retainer bar 34 and track shoe 28, further relative rotation between the bolt 52 and nut 54 results in a camming or wedging acting between the external thread convolution 66 on the bolt 52 and the internal thread convolution 68 on the nut 54. Thus, once the nut and bolt have been tightened so that they are held against axial movement relative to each other by engagement with the retainer bar 34 and track shoe 28, continued relative rotation between the nut and bolt results in the relatively long trailing flank surfaces 72 on the bolt cooperating with the relatively long trailing flank surfaces 82 on the collar of the nut to cam the collar radially outwardly in the manner illustrated schematically in FIG. 7. This expansion of the cylindrical collar 62 eliminates the excess space in the hole in the retainer bar 34. Thus as the bolt 52 continues to be rotated relative to the nut 54, the relatively long trailing flank surfaces 72 on the bolt 52 tends to shift toward the left (as viewed in FIG. 6) relative to the relatively long flank surface 82 on the nut 62. This results in a camming or wedging action which expands the collar 62 radially outward from the initial position shown schematically in solid lines in FIG. 7 to the expanded position shown in dashed lines in FIG. 7. Of course, as the collar 62 is expanded radially outwardly, it engages the side surfaces of the hole in the retainer bar 34. This prevents the collar 62 from freely expanding outwardly in the manner illustrated schematically in FIG. 7. As the collar 62 expands, it fills the hole in the retainer bar 34 to eliminate excess space and hold the nut 54 against sidewise movement relative to the retainer bar.

As this wedging action occurs between the external and internal thread convolutions 66 and 68, the space between the leading flank surface 76 on the bolt 52 and the leading flank surface 88 on the nut 54 (see FIG. 6) increases. It should be understood that although the space between the leading flank surfaces 76 and 88 on the bolt 52 and nut 54 increases, the bolt and nut do not move axially relative to each other. This is because the head end 74 of the bolt 52 and the body 86 of the nut 54 engage the track shoe 28 and retainer bar 34 to hold the nut and bolt against axial movement relative to each other.

To provide for the camming or wedging action between the external and internal thread convolution 66 and 68, the external and internal thread convolution have relatively long trailing flank surfaces 72 and 82. Thus, the trailing flank surface 72 of the external thread convolution 66 has a substantially greater length between the helical root or minor diameter 100 and the crest or major diameter 102 of the external thread convolution than does the leading flank surface 76 of the external thread convolution. Similarly, the trailing flank surface 82 of the internal thread convolution 68 has a greater length between a helical root or major diameter 106 and a crest or minor diameter 108 of the internal thread convolution than does the relatively short leading flank surface 88.

To facilitate deflection of the collar 62 upon tightening of the fastener assembly 48, the collar 62 is separated into a pair of arcuate sections 112 and 114 by a pair of axially extending grooves or slots 116 and 118 (see FIGS. 4 and 5). The grooves 116 and 118 extend completely through the sidewall of the nut 54 in a radial direction. The straight grooves 116 and 118 extend axially from the annular leading end surface 90 of the collar 62 to arcuate end surfaces 122 and 124 formed in the hexagonal body portion 86 of the nut 54. By splitting the collar 62 with the diametrally opposite and axially extending grooves 116 and 118, the collar can be readily deflected outwardly under the influence of the camming action between the external thread convolution 66 on the bolt 52 and the internal thread convolution 68 on the nut 54. Although only a pair of grooves 116 and 118 have been illustrated, it should be understood that any desired number of grooves could be provided.

To prevent the fastener assembly 48 (FIG. 2) from loosening, an axially outermost thread convolution 130 (see FIG. 7) on the trailing end of the nut body 86 clampingly engages a turn of the external thread convolution 66 formed on the bolt 52. Thus as the arcuate sections 112 and 114 of the split collar 62 are cammed apart from the initial position shown in solid lines in FIG. 7 toward the expanded position shown in dashed lines, the trailing or opposite end of the nut 54 is contracted to firmly grip the external thread convolution 66 on the bolt 52. This results in the thread convolution 130 applying a clamping action against the bolt 52 to firmly hold the bolt against rotation relative to the nut. Thus, the camming or wedging action between the relatively long trailing flanks 72 and 82 of the external thread convolution 66 and internal thread convolution 68 causes the collar 62 on the nut 54 to expand and at least a portion of the polygonal body 86 of the nut to contract to perform the dual functions of eliminating any excess space in a hole in which the collar 62 is disposed and of firmly gripping the bolt 52.

In the embodiment of the invention shown in FIGS. 3-7, the external and internal thread convolutions 66 and 68 have relatively long trailing flank surfaces 72 and 82 which extend parallel to each other and relatively short leading flank surfaces 76 and 88 which also extend parallel to each other (see FIG. 6). Thus, the trailing flank surfaces 72 and 82 on the external and internal thread convolutions 66 and 68 extend at the same acute angle (designated by the numeral 136 in FIG. 6) relative to a plane designated by the numeral 138. The plane 138 extends perpendicular to the coincident longitudinally extending axes of the externally threaded bolt 52 and internally threaded nut 54.

Similarly, the relatively short leading flank surfaces 76 and 88 of the external and internal thread convolutions 66 and 68 extend at the same acute angle 140 relative to the plane 138. Although the angles 136 and 140 could have many different values, the angle 136 is substantially larger than the angle 140. This is so that the trailing flank surfaces 72 and 82 are longer in a radial plane than the leading flank surfaces 76 and 88. In the specific embodiment of the invention illustrated in FIG. 6, the angle 136 is 60° and the angle 140 is 30°.

Figure 8:
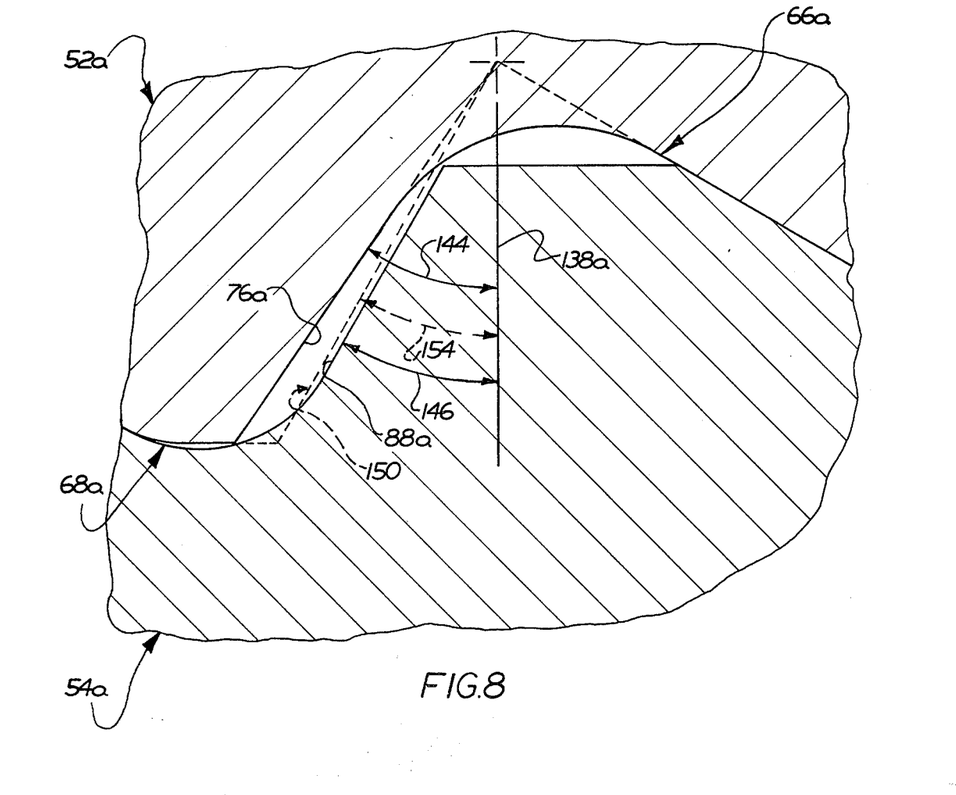
FIG. 8 is an enlarged fragmentary sectional view of another embodiment of the internal and external thread convolutions in which relatively short flank surfaces of the bolt extend at an acute angle to relatively short flank surfaces of the nut to tend to maximize clearance between the internal and external thread convolutions.

In the embodiment of the invention shown in FIG. 8, the clearance space between the crest or major diameter of the external thread convolution and the root or major diameter of the internal thread convolution is increased by increasing the angle between a leading flank surface of the external thread convolution and a radially extending plane. This results in a nonparallel relationship between the leading flank surfaces of the internal and external thread convolutions. By increasing the angle between the flank surface of the external thread convolution and the radial plane, the load carrying cross sectional area of the inherently weaker internal thread convolution is not impaired. Although there is a slight decrease in the cross sectional area of the external thread convolution, the external thread convolution is inherently stronger since it is rolled rather than cut. Therefore, decreasing the cross sectional area of the external thread convolution does not impair the overall load carrying capabilities of the fastener assembly. Since the embodiment of the invention shown in FIG. 8 is generally similar to the embodiment of the invention shown in FIGS. 3-6, similar numerals will be utilized to designate similar components, the suffix letter "a" being associated with the elements of FIG. 8 in order to avoid confusion.

An externally threaded member or bolt 52a has a helical external thread convolution 66a which is disposed in threaded engagment with a helical internal thread convolution 68a on an internally threaded member or nut 54a. In accordance with a feature of this embodiment of the invention, the leading flank surface 76a of the external thread convolution 66a extends at an acute angle 144 relative to a radial plane 138a. The plane 138a extends perpendicular to the longitudinal central axis of the externally threaded member or bolt 52a and internally threaded member or nut 54a. The leading flank surface 88a of the internal thread convolution 68a extends at an acute angle 146 relative to the radial plane 138a.

In accordance with a feature of this embodiment of the invention, the angle 144 is larger than the angle 146. Therefore, the helical leading flank surface 76a on the external thread convolution 66a does not extend parallel to the leading helical flank surface 88a of the internal thread convolution 68a.

The nonparallel relationship between the flank surfaces 76a and 88a increases the clearance between the external and internal thread convolutions 66 and 68. Thus, if the flank surface 76a of the external thread convolution 66a extended parallel to the flank surface 88a of the internal thread convolution 68a in the manner indicated in dashed lines at 150 in FIG. 8, there would be interference between the crest or major diameter of the external thread convolution and the root or major diameter of the internal thread convolution in the manner indicated by the dashed lines in FIG. 8.

Although the angle 144 between the flank surface 76a and the radially extending plane 138a could have many different values, in one specific instance, the angle 144 was 35° while the angle 146 was 30°. If the leading flank surfaces 76a and 88a were to extend parallel to each other, the flank surface 76a would extend at an angle indicated in dashed lines at 154 in FIG. 8. By effectively increasing the angle 154 by 5°, the interference at the area indicated by the dashed lines 150 in FIG. 8 is eliminated to thereby tend to maximize the extend to which the relatively long trailing flank surfaces of the internal and external thread convolutions are in abutting engagement with each other.

In the embodiment of the invention shown in FIGS. 3-6, the internally threaded member or nut is split by the grooves 116 and 118 (see FIG. 5) which extend completely through the side wall of the collar 62. Thus, the grooves 116 and 118 extend from a cylindrical outer side surface 155 of the collar 62 through the internal thread convolution 68. In this embodiment of the invention, the arcuate sections 112 and 114 of the collar 162 are free to move relative to each other. This can result in distortion of the collar during heat treatment and/or handling of the nut 54.

Figure 9:
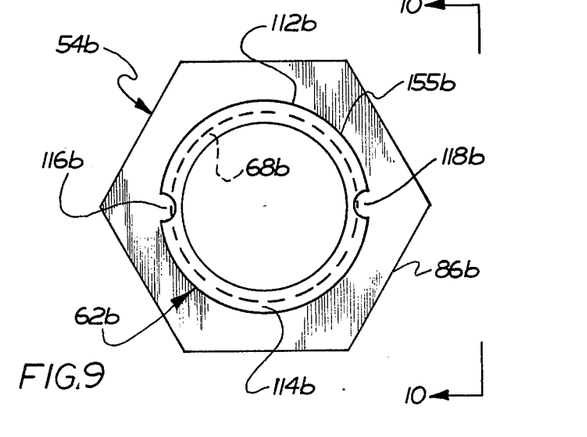
FIG. 9 is a plan view, generally similar to FIG. 5, of an embodiment of the nut in which grooves extend part way through a side wall and an internal thread convolution in an expandable portion of the nut.
Figure 10:
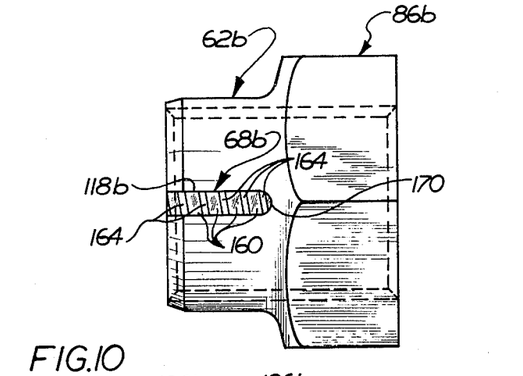
FIG. 10 is a view taken generally along the line 10—10 on FIG. 9, illustrating the manner in which the crest of the internal thread convolution spans a groove in the side wall of the nut.
Figure 11:
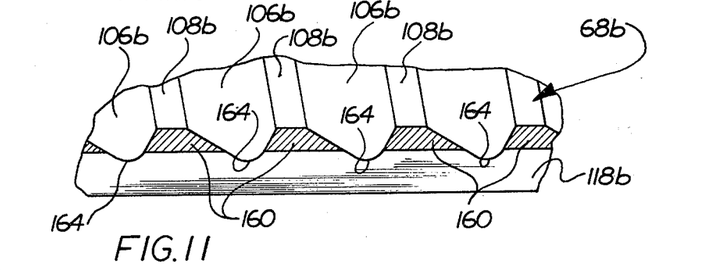
FIG. 11 is a fragmentary sectional view illustrating the manner in which openings are formed in the groove of the nut of FIGS. 9 and 10 between portions of an internal thread convolution.

In order to prevent undesired distortion of the cylindrical collar 62, the grooves in the collar in the embodiment of the invention shown in FIGS. 9-11 extend only part way through the collar. The depth of the grooves in the collar is such that the grooves are spanned by the crest of the internal thread convolution in the nut. Since the embodiment of the nut shown in FIGS. 9-11 is generally similar to the embodiment shown in FIGS. 4-6, similar numerals will be utilized to designate similar components, the suffix letter "b" being associated with FIGS. 9-11 to avoid confusion.

The internally threaded member or nut 54b (FIG. 9) has a hexagonal body 86b with an axially extending cylindrical collar 62b. A pair of axially extending grooves 116b and 118b are formed in diametrically opposite side portions of the cylindrical collar 62b. Although the grooves 116 and 118 extend completely through the internal thread convolution 68 in the collar 62 of FIGS. 4 and 5, the grooves 116b and 118b extend only part way through the internal thread convolution 68b formed in the collar 62b. This results in the internal thread convolution 68b having sections 160 (see FIG. 10) which span the groove 118b (see FIGS. 10 and 11).

The crest 108b (FIG. 11) of the internal thread convolution 68b is disposed on the sections 160 which bridge or span the groove 118b. There are openings 164 formed at the root or major diameter 106b of the internal thread convolution 68b between the bridging sections 160 (see FIGS. 10 and 11). It should be understood that although only the groove 118b has been illustrated in FIGS. 10 and 11, the groove 116b has bridging or spanning sections which correspond to the sections 160 and openings which corresponds to the openings 164 between the sections.

The relatively weak spanning sections of the internal thread convolution 68b have sufficient strength to hold the two arcuate sections 112b and 114b (see FIG. 9) against movement relative to each other to prevent distortion of the collar 62b. However, the spanning sections 160 across the two straight grooves 116b and 118b can be readily broken or ruptured under the influence of the camming or wedging action between the relatively long flank surfaces of the internal and external thread convolutions when a bolt is screwed into the nut. This results in radial expansion of the collar 62b in the same manner as was previously described in connection with the embodiment of the invention shown in FIGS. 3-6.

In the embodiment of the invention shown in FIGS. 4 and 5, the straight grooves 116 and 118 extend into the hexagonal body portion 86 of the nut 54. In the embodiment of the invention shown in FIGS. 9-11, the axially extending straight grooves 116b and 118b stop short of the body portion 86b of the nut. Thus, the groove 118b has an arcuate end surface 170 (FIG. 10) which is disposed in the collar portion 62b of the nut. This results in the hexagonal body portion 86b of the nut 54b being somewhat stronger than the hexagonal body portion 86 of the nut shown in FIGS. 4 and 5.

In view of the foregoing description it is apparent that the present invention provides a new and improved fastener assembly 48 which is advantageously utilized to mount shoe members 28 of an endless track assembly 26 on a tire carcass 24. In order to enhance the operating life of the endless track assembly 26, the fastener assembly 48 includes an externally threaded member or bolt 52 which expands an internally threaded member or nut 54 to completely fill any excess space in a hole in which the nut is received. In addition, the bolt 52 causes a portion of the nut 54 to contract and clamp the bolt in place.

To effect simultaneous expansion and contraction of different portions of the nut 54, the nut and bolt 52 have thread convolutions 66 and 68 with relatively long trailing flank surfaces 72 and 82 which apply a wedging action against the sides of the nut. The nut 54 is grooved so that a collar portion 62 of the nut is free to expand under the influence of a wedging action between the relatively long trailing flank surfaces 72 and 82 of the internal and external thread convolutions 66 and 68. An ungrooved portion of the body portion 86 of the nut is contracted under the influence of the wedging action to securely clamp or grip the bolt.

In order to make the nut 54a (FIG. 8) as strong as possible, the leading flank surface 76a on the bolt 52a is formed to extend at an acute angle to the leading flank surface 88a on the nut. This relationship between the flank surfaces of the internal and external thread convolutions 66a and 68a enables the inherently weaker internal thread convolution to have a relatively large cross sectional area.

During heat treating and/or handling of the nut, a thin walled grooved section of the nut may become deformed. In order to prevent this from happening, the grooves 116b and 118b (FIGS. 9-11) extend only part way through the thin wall of the expandable section of the nut 54b. This results in the groove being spanned by crest portions 108b of the internal thread convolution 68b to hold sections 112b and 114b of the nut against movement relative to each other.

Although a fastener assembly 48 constructed in accordance with the present invention is advantageously utilized in an endless track assembly 26 to hold a shoe 28 in place, it is contemplated that the fastener assembly could be utilized in many different environments. It is believed that the fastener assembly 48 will be particularly advantageous in environments where relatively large shear forces are present between members which are to be interconnected. By forming the nut 54 in such a manner that it can be expanded to eliminate excess pace in a hole in which a portion of the nut is received, by shearing action between a pair of interconnected members tends to be minimized to thereby enhance the operating life of a connection between the members. Thus, it is contemplated that a fastener assembly constructed in accordance with the present invention could be utilized in many different environments in which the fastener assembly is subjected to relatively large shear forces.

Having described specific preferred embodiments of the invention, the following is claimed:

1. An assembly comprising an externally threaded member having leading and trailing end portions, said externally threaded member having a thread convolution with a leading flank surface disposed on a side of the thread convolution toward the leading end portion of said externally threaded member and a trailing flank surface disposed on a side of the thread convolution toward the trailing end portion of said externally threaded member, said trailing flank surface having a greater length measured between root and crest portions of said external thread convolution than said leading flank surface, an internally threaded member having leading and trailing end portions, said internally threaded member having an internal thread convolution with a leading end portion which is disposed in the leading end portion of said internally threaded member and a trailing end portion which is disposed in the trailing end portion of said internally threaded member, said external thread convolution being engageable with said leading end portion of said internal thread convolution prior to engagement of said external thread convolution with said trailing end portion of said internal thread convolution, said leading end portion of said internally threaded member including a plurality of grooves each of which extends at least part way through said internal thread convolution from an outer side surface of said internally threaded member, said internal thread convolution having a leading flank surface disposed on a side of the internal thread convolution toward the leading end portion of said internally threaded member and a trailing flank surface disposed on a side of the internal thread convolution toward the trailing end portion of said internally threaded member, said trailing flank surface of said internal thread convolution having a greater length measured between root and crest portions of said internal thread convolution than said leading flank surface of said internal thread convolution, and means for expanding the leading end portion of said internally threaded member and contracting the trailing end portion of said internally threaded member to clampingly engage a turn of the external thread convolution with a turn of the internal thread convolution disposed in the trailing end portion of said internally threaded member, said means for expanding the leading end portion of said internally threaded member and contracting the trailing end portion of said internally threaded member including the relatively long trailing flank surfaces of said internal and external thread convolutions, first surface means connected with said trailing end portion of said externally threaded member for holding said externally threaded member against axial movement relative to said internally threaded member after said external thread convolution has engaged said internal thread convolution throughout the entire length of said internal thread convolution, and second surface means connected with said internally threaded member for holding said internally threaded member against axial movement relative to said externally threaded member after said internal thread convolution has engaged said external thread convolution throughout the entire length of said internal thread convolution.

2. An assembly as set forth in claim 1 wherein trailing flank surface of said external thread convolution is disposed in abutting engagement with and extends parallel to said trailing flank surfae of said internal thread convolution, said leading flank surface of said external thread convolution being spaced apart from and extending at an acute angle to said leading flank surface of said internal thread convolution.

3. An assembly as set forth in claim 1 wherein each of said grooves in said leading end portion of said internally threaded member extends completely through the internal thread convolution.

4. An assembly as set forth in claim 1 wherein each of said grooves in said internally threaded member extends part way through said internal thread convolution span each of the grooves and openings are formed in the bottom of the grooves at the root portions of said internal thread convolution.

5. An assembly as set forth in claim 1 wherein said internally threaded member includes a polygonal body portion and a cylindrical collar portion which extends axially outwardly from said body portion, said leading end portion of said internal thread convolution being disposed in said collar portion of said internally threaded member and said trailing end portion of said internal thread convolution being disposed in said body portion, each groove of said plurality of grooves extending along said collar portion throughout its axial extend and terminating in said body portion.

6. An assembly as set forth in claim 1 wherein said internally threaded member includes a polygonal body portion and a cylindrical collar portion which extends axially outwardly from said body portion, said leading end portion of said internal thread convolution being disposed in said collar portion of said internally threaded member and said trailing end portion of said internal thread convolution being disposed in said body portion, each groove of said plurality of grooves extending axially along said collar portion and terminating in said collar portion at a location spaced from said body portion.

7. An assembly comprising a circular wheel rim having a central axis, a tire carcass mounted on said wheel rim, and endless track means connected with said tire carcass for engaging a support surface, said endless track means including a mounting belt circumscribing said tire carcass, an elongated shoe member disposed adjacent to an outer side surface of said mounting belt, an elongated retainer member having a longitudinal axis extending parallel to the longitudinal axis of said shoe member and to the central axis of said wheel rim, and fastener means for interconnecting said shoe and retainer members with a portion of said mounting belt held between said shoe and retainer members, said fastener means including an externally threaded member which extends through circular openings formed in said shoe and retainer members, said externally threaded member having a head end portion disposed in abutting engagement with one of said shoe and retainer members and a free end portion projecting outwardly from the other one of said shoe and retainer members, an internally threaded member disposed in threaded engagement with said externally threaded member, said internally threaded member having a body section disposed in abutting engagement with said other one of said shoe and retainer members and having an expandable section extending into the opening formed in said other one of said shoe and retainer members, said expandable section of said internally threaded member being expandable from an initial size which is smaller than the opening in said other one of said shoe and retainer members to a second size which is the same as the size of the opening in said other one of said shoe and retainer members to eliminate any excess space in the opening in said other one of said shoe and retainer members, said externally threaded member having a thread convolution with a leading flank surface disposed on a side of the thread convolution away from the head end portion of said externally threaded member and a trailing flank surface which is disposed on a side of the thread convolution toward the head end portion of said externally threaded member, said trailing flank surface having a greater length measured between root and crest portions of said external thread convolution than said leading flank surface, said internally threaded member having an internal thread convolution with a leading flank surface disposed on a side of the internal thread convolution toward said expandable section and a trailing flank surface disposed on a side of the internal thread convolution toward said body section, said trailing flank surface of said internal thread convolution having a greater length measured between root and crest portions of said internal thread convolution than said leading flank surface of said internal thread convolution, and means for expanding the expandable section of said internally threaded member to eliminate any excess space in the opening in said other one of said shoe and retainer members and for contracting the body section of said internally threaded member to clampingly engage a turn of the external thread convolution with a turn of the internal thread convolution disposed in the body section of said internally threaded member.

8. An assembly as set forth in claim 7 wherein said means for expanding the expandable section of said internally threaded member and for contracting the body section of said internally threaded member includes the relatively long trailing flank surfaces of said internal and external thread convolutions, said head end portion of said externally threaded member cooperating with said one of said shoe and retainer members to hold said externally threaded member against axial movement relative to said internally threaded member after said external thread convolution has engaged said internal thread convolution, siad body section of said internally threaded member cooperating with said other one of said shoe and retainer members to hold said internally threaded member against axial movement relative to said externally threaded member after said internal thread convolution has engaged said external thread convolution throughout the entire length of said internal thread convolution.

* * * * *